United States Patent [19]

Asano et al.

[11] Patent Number: 4,939,957

[45] Date of Patent: Jul. 10, 1990

[54] LINE PRESSURE CONTROL ARRANGEMENT FOR AUTOMATIC TRANSMISSION

[75] Inventors: Hiroshi Asano, Zama; Shigeru Ishii, Atsugi, both of Japan

[73] Assignee: Nissan Motor Co., Ltd., Yokohama, Japan

[21] Appl. No.: 347,636

[22] Filed: May 5, 1989

[30] Foreign Application Priority Data

May 6, 1988 [JP] Japan .................. 63-109101

[51] Int. Cl.$^5$ .............................................. B60K 41/18
[52] U.S. Cl. .......................................... 74/866; 74/867
[58] Field of Search ................................. 74/866, 867

[56] References Cited

U.S. PATENT DOCUMENTS

| | | | |
|---|---|---|---|
| 4,308,765 | 1/1982 | Iwanaga et al. | 74/867 X |
| 4,388,844 | 6/1983 | Arai et al. | 74/867 X |
| 4,488,456 | 12/1984 | Taga et al. | 74/866 |
| 4,552,036 | 11/1985 | Takano et al. | 74/867 X |
| 4,736,301 | 4/1988 | Osanai | 74/866 X |
| 4,751,858 | 6/1988 | Iwatsuki | 74/867 |
| 4,836,055 | 6/1989 | Suzuki | 74/866 |

*Primary Examiner*—Dirk Wright
*Attorney, Agent, or Firm*—Foley & Lardner, Schwartz, Jeffery, Schwaab, Mack, Blumenthal & Evans

[57] ABSTRACT

Engine torque is derived using the air flow and engine speed, and used to determine the basic level of line pressure. The opening degree of the engine throttle valve is sensed and the level of the line pressure increased according to a correction schedule in the event that the throttle valve is opened beyond a predetermined amount.

4 Claims, 3 Drawing Sheets

LINE PRESSURE CONTROL ARRANGEMENT FOR AUTOMATIC TRANSMISSION

BACKGROUND OF THE INVENTION

1. Field of the Invention

The present invention relates generally to automatic transmission for use in automotive vehicles and more specifically to a line pressure control arrangement for such a transmission.

2. Description of the Prior Art

An automatic transmission Service Manual (publication A261C07) issued in March 1987 relating to the so called RE4RO1A type transmission describes an arrangement which utilizes tabled data for controlling the line pressure during shifting and non-shifting modes of transmission operation.

In this arrangement in order to control the level of line pressure to one suited for the instant mode of engine operation and thus obviate shift shock which tends to be induced by excessively high line pressures, the engine throttle valve opening degree is used to determine the duty cycle of a signal which is used to control a line pressure control solenoid valve.

However, with this arrangement, because the amount of torque produced with respect to a given throttle setting tends to vary widely during low throttle setting modes of operation, shift shock still tends be produced.

During attempts to remedy this problem, a less preferred embodiment of the present invention has attempted to use engine torque (as indicated by air flow for example) in place of the throttle valve position parameter. However, with this measure, at high engine speeds with the throttle valve setting in the high zone, during shifting, the effects of inertia are such as to prolong the shifting time and to interfere with the synchronization of the rotational speeds of the input and output shafts of the transmission for the given shift. Accordingly, shift shock tends to be produced and the problem is merely moved from a low throttle setting mode to a high one.

SUMMARY OF THE INVENTION

It is an object of the present invention to provide a line pressure control arrangement which adequately attenuates shift shock due to inappropriate line pressure levels during both low and high throttle opening degrees.

In brief, this object is achieved by an arrangement which is responsive to engine torque as derived using the air flow and the engine speed to determine the basic level of line pressure and which is further responsive to the opening degree of the engine throttle valve to appropriately increase the basic line pressure level for a given amount of engine torque, when the throttle valve is opened beyond a predetermined position.

More specifically, a first aspect of the present invention is deemed to comprise a vehicle which has an engine, the engine having a throttle valve, and which features: a throttle position sensor for sensing the position of the throttle valve and outputting a signal indicative thereof; an engine speed sensor, the engine speed sensor being arranged to output a signal indicative of the rotational speed of the engine; an air flow sensor, the air flow sensor being arranged to output a signal indicative of the amount of air being inducted into the engine; a transmission, the transmission having a line pressure control arrangement comprising circuit means for: determining the amount of torque being applied to the transmission based on the outputs of the air flow sensor and the engine speed sensor; determining the level of line pressure appropriate for the instant amount of torque being applied; the instant throttle opening degree with a predetermined value; and increasing the level of line pressure for the amount of torque being applied to the transmission in the event that the instant throttle valve opening degree is greater than the predetermined value.

A second aspect of the present invention is deemed to comprise a method of controlling the level of line pressure in a transmission which transmission is associated with an engine having a throttle valve, the method featuring the steps of: sensing the position of the throttle valve; sensing the rotational speed of the engine; sensing the amount of air which is being inducted into the engine; determining the amount of engine torque based on the amount of air being inducted and the engine rotational speed; determining the level of line pressure appropriate for the instant amount of torque being applied; comparing the instant throttle opening degree with a predetermined value; and increasing the level of the line pressure for the amount of torque being applied to the transmission in the event that the instant throttle valve opening degree is greater than the predetermined value.

A third aspect of the invention is deemed to comprise a transmission which is associated with an engine having a throttle valve and which transmission features: means for sensing the position of the throttle valve; means for sensing the rotational speed of the engine; means for sensing the amount of air which is being inducted into the engine; means for determining the amount of engine torque being applied to the transmission based on the amount of air being inducted and the engine rotational speed; means for determining the level of line pressure appropriate for the amount of torque being applied; means for comparing the instant throttle opening degree with a predetermined value; and means for increasing the level of the line pressure for the amount of torque being applied to the transmission in the event that the instant throttle valve opening degree is greater than the predetermined value.

A fourth aspect of the present invention is deemed to comprise a vehicle which features: an engine; an induction conduit which leads to the engine; a throttle valve, the throttle valve being disposed in the induction conduit; a throttle valve position sensor for sensing the opening degree of the throttle valve; an air flow meter, the air flow meter being disposed in the induction conduit at a location upstream of the throttle valve; an engine speed sensor for sensing the rotational speed of the engine; a transmission, the transmission being operatively operated with the internal combustion engine, the transmission having an input shaft and an output shaft and a plurality of friction elements, the friction elements being selectively engageable to produce a plurality of gears; a source of line pressure which supplies hydraulic fluid under pressure via which the friction elements are engaged; a line pressure control solenoid, the line pressure solenoid being arranged to be operated by a control signal the duty cycle of which is selectively variable, the line pressure solenoid being arranged so that the line pressure increases with increase in the duty cycle of the control signal; a memory in which first and second schedules are stored, the first schedule being recorded in terms of engine torque and line pressure, the second schedule being recorded in terms of throttle valve position and a line pressure correction value; a control circuit, the control circuit being operatively connected with an responsive to the throttle position sensor, the air flow meter and the engine speed sensor first, second and third sensors, the control circuit being operatively connected with the memory and arranged to produce the control signal, the control circuit comprising circuit means for: determining the amount of torque being applied to the transmission based on the outputs of the air flow meter and the engine speed sensor; using the first schedule stored in the memory to determine a line pressure level suited for the amount of torque being applied to the transmission; comparing the instant throttle opening degree with a predetermined value; and increasing the level of line pressure in accordance with the second schedule in the event that the instant throttle valve opening degree is greater than the predetermined value.

DETAILED DESCRIPTION OF THE PREFERRED EMBODIMENTS

Figure 1:
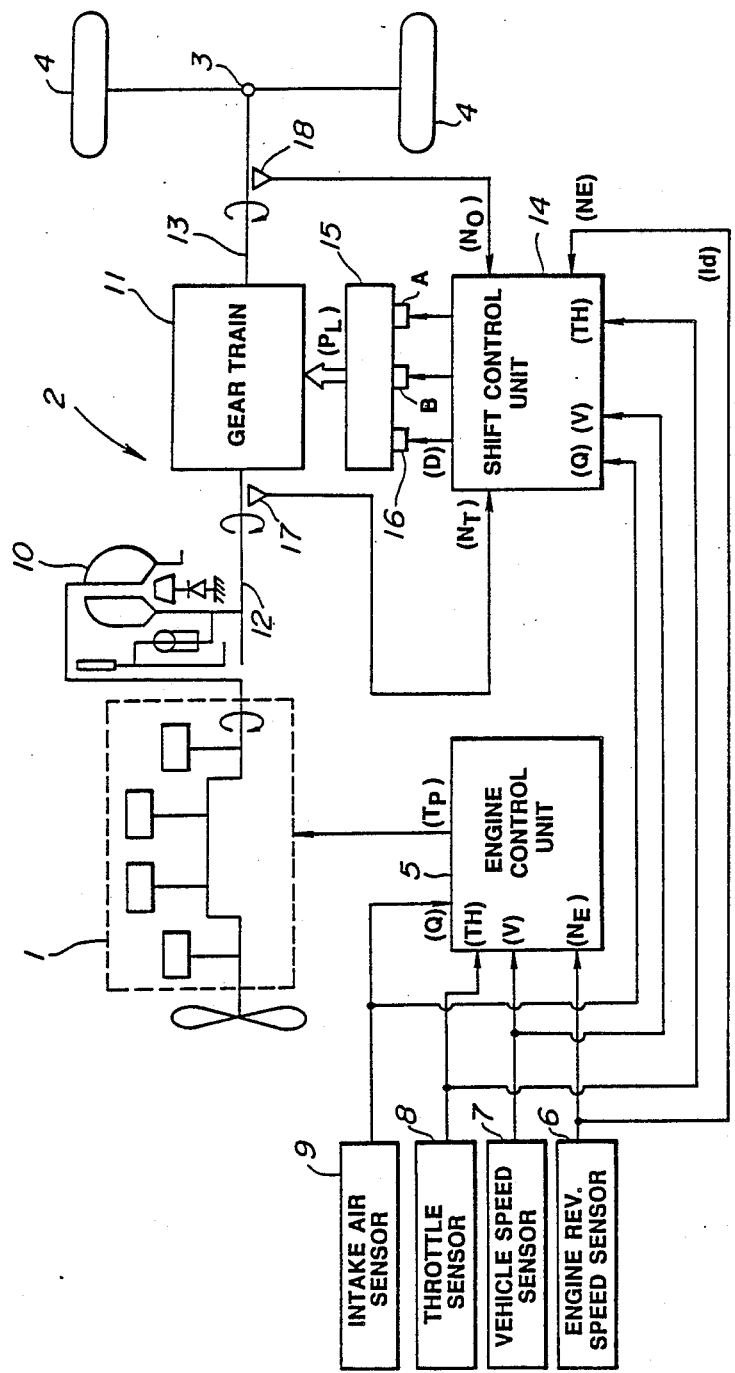
FIG. 1 shows in schematic and block diagram form, an engine/transmission power train to which the present invention is applied.

FIG. 1 shows a power train to which an embodiment of the present invention is applied. In this arrangement an electronically fuel injected internal combustion engine 1 is operatively connected by way of a power train 2 (generally denoted by the numeral 2) with a differential gear 3. Driving wheels 4 are connected to the differential 3.

It should be understood that even though FIG. 1 shows a F-R power train (front engine - rear wheel drive) the present invention is not limited to the same and can be applied to FF or MR type arrangements if so desired.

The engine control system includes an engine control unit 5 which is supplied inputs from an engine speed sensor 6, a vehicle speed sensor 7, a throttle position sensor 8, and an intake air sensor (air flow meter) 9.

Based on the inputs of sensors 6 to 9, (viz., NE, V, TH, and Q) the control unit 5, which in this instance includes a microprocessor (not show), derives the appropriate injection control pulse width (Tp) and applies the same to the fuel supply system of the engine.

In this embodiment the power train 2 includes a RE4-RO1A type transmission developed by NISSAN MOTOR CO. LTD., the construction and arrangement of which is described in detail in the Service Manual A261CO7 published by the above mentioned company.

A torque converter 10 including a lock-up clutch provides an operative connection between the output shaft of the engine and an input shaft 12 of a gear train 11. A transmission output shaft 13 provides a drive connection between the differential or final gear 3 and the transmission.

The system includes a shift control unit 14 which also includes a microprocessor. This unit 14 is arranged to issue control signals to a control valve unit 15 which forms part of the transmission. The control valve unit 15 includes three solenoids A, B and D.

In this embodiment the transmission includes a gear train comprising a plurality of planetary gear units, and associated hydraulically operated clutches and brakes (not shown). The brakes and clutches are operated by the supply of so called "line pressure" PL which is selectively supplied from the control valve unit 15.

Depending on the energization of solenoids A and B, the transmission is conditioned to selectively produce a number of different gear ratios by selectively inducing line pressure PL to be supplied to the appropriate friction elements.

In this instant arrangement four forward gear ratios of the transmission can be produced in the manner indicated in the table below.

TABLE

| GEAR: | FIRST | SECOND | THIRD | FOURTH |
|---|---|---|---|---|
| SOL. A: | ON | OFF | OFF | ON |
| SOL. B: | ON | ON | OFF | OFF |

The third solenoid D of the control valve unit 15 is arranged to be operated on a variable duty cycle and to control the level of the line pressure PL. With this arrangement as the duty cycle increases the level of the line pressure is increased.

The shift control unit 14 is arranged to receive data inputs NT and NO from rotational speed sensors 17 and 18 respectively. As will be appreciated from the drawings, NT is indicative of the rotational speed of the input shaft 12 of the transmission while NO is indicative of the rotational speed of the transmission output shaft 13.

It is worth noting that the output of the sensor 18 can be used additionally as a vehicle speed indicative signal if so desired.

This unit 14 further receives data inputs NE, V, TH and Q from the engine speed sensor 6, vehicle speed sensor 7, the throttle position sensor 8 and the air flow meter 9.

Figure 2:
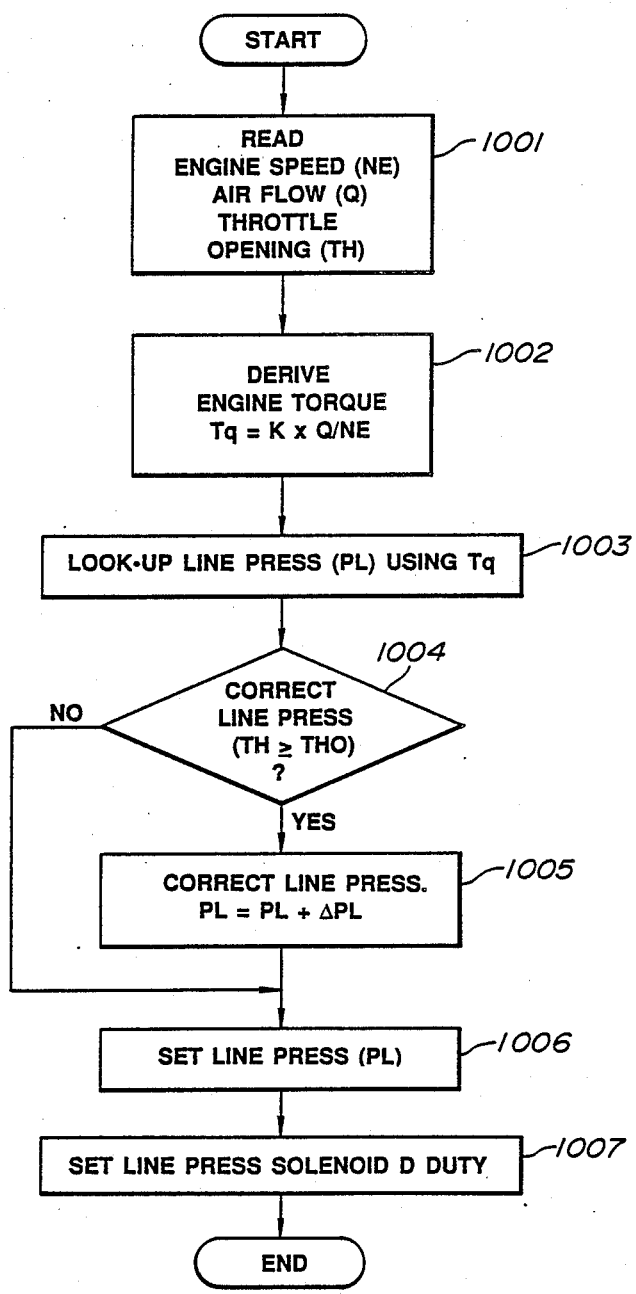
FIG. 2 is a flow chart which shows the characterizing steps which are executed by a control routine according to the present invention.
Figure 3:
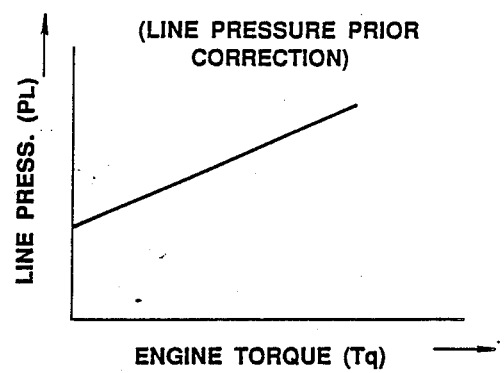
FIGS. 3, 4 and 5 are charts which show in terms of a line pressure level and engine torque or throttle opening, the line pressure characteristics which developed prior correction, the line pressure correction and the line pressure characteristics which are produced as a result of the correction, respectively.

A program of the nature depicted in the flow chart of FIG. 1 is run in the shift control unit microprocessor in order to derive the appropriate duty cycle signal via which solenoid D is controlled. In this embodiment the routine shown in FIG. 2 is arranged to be run at 10 msec intervals (by way of example).

At step 1001 of the above mentioned routine, the outputs of the engine speed sensor, air flow meter and the throttle position sensor are sampled. Following this, the amount of torque being developed by the engine is derived using equation (1)

$$Tq = K \times Q/NE \ldots \qquad (1)$$

At step 1003 the value of Tq is used in a table look-up to obtain a line pressure value. Following this, at step 1004 it is determine if it is necessary to correct the line pressure or not. In this case this decision is made by comparing the instant throttle opening degree with a predetermined value (viz., $TH \geq THo$ ?). If the outcome is such as to indicate that $TH < THo$ then the routine by-passes step 1005 and goes to step 1006 wherein the level of line pressure is set to that determined by the table look-up performed in step 1003. Next, in step 1007 the appropriate duty cycle (%) of the signal which should be applied to solenoid D in order to produce the set level of line pressure is derived.

Figure 4:
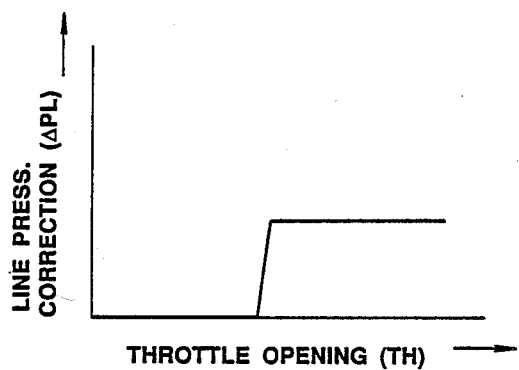

However, in the event that the throttle opening degree is found to be equal to or greater than THo at step 1004 then the routine proceeds to step 1005 wherein a line pressure correction amount is obtained using the data of the nature depicted in FIG. 4 and the appropriate line pressure derived using equation (2)

$$PL = PL + \Delta PL \ldots \quad (2)$$

Figure 5:
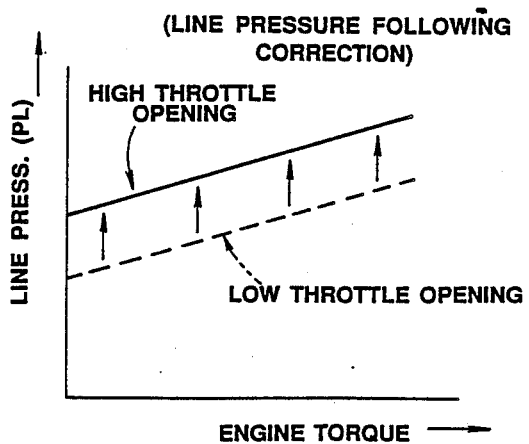

Accordingly, the level of line pressure is boosted by the value of $\Delta PL$ in the manner as shown in FIG. 5.

Accordingly, at high throttle openings the level of line pressure is appropriately elevated and the problem discussed in the opening paragraphs of the instant disclosure is overcome.

What is claimed is

1. In a vehicle;
an engine, said engine having a throttle valve;
a throttle position sensor for sensing the position of said throttle valve and outputting a signal indicative thereof;
an engine speed sensor, said engine speed sensor being arranged to output a signal indicative of the rotational speed of said engine;
an air flow sensor, said air flow sensor being arranged to output a signal indicative of the amount of air being inducted into said engine;
a transmission, said transmission having a line pressure control arrangement comprising circuit means for:
determining the amount of torque being applied to said transmission based on the outputs of said air flow sensor and said engine speed sensor;
determining the level of line pressure appropriate for the instant amount of torque being applied;
comparing the instant throttle opening degree with a predetermined value; and
increasing the level of line pressure for the amount of torque being applied to said transmission in the event that the instant throttle valve opening degree is greater than said predetermined value.

2. A method of controlling the level of line pressure in a transmission which transmission is associated with an engine having a throttle valve, the steps of:
sensing the position of the throttle valve;
sensing the rotational speed of the engine;
sensing the amount of air which is being inducted into the engine;
determining the amount of engine torque based on the amount of air being inducted and the engine rotational speed;
determining the level of line pressure appropriate for the instant amount of torque being applied;
comparing the instant throttle opening degree with a predetermined value; and
increasing the level of the line pressure for the amount of torque being applied to said transmission in the event that the instant throttle valve opening degree is greater than said predetermined value.

3. In a transmission which is associated with an engine having a throttle valve: means for sensing the position of the throttle valve;
means for sensing the rotational speed of the engine;
means for sensing the amount of air which is being inducted into the engine;
means for determining the amount of engine torque being applied to the transmission based on the amount of air being inducted and the engine rotational speed;
means for determining the level of line pressure appropriate for the amount of torque being applied;
means for comparing the instant throttle opening degree with a predetermined value; and
means for increasing the level of the line pressure for the amount of torque being applied to said transmission in the event that the instant throttle valve opening degree is greater than said predetermined value.

4. In a vehicle;
an engine;
an induction conduit which leads to said engine;
a throttle valve, said throttle valve being disposed in said induction conduit;
a throttle valve position sensor for sensing the opening degree of said throttle valve;
an air flow meter, said air flow meter being disposed in said induction conduit at a location upstream of said throttle valve;
an engine speed sensor for sensing the rotational speed of the engine;
a transmission, said transmission being operatively operated with said internal combustion engine, said transmission having an input shaft and an output shaft and a plurality of friction elements, said friction elements being selectively engageable to produce a plurality of gears;
a source of line pressure which supplies hydraulic fluid under pressure via which said friction elements are engaged;
a line pressure control solenoid, said line pressure solenoid being arranged to be operated by a control signal the duty cycle of which is selectively variable, said line pressure solenoid being arranged so that the line pressure increases with increase in the duty cycle of said control signal;
a memory in which first and second schedules are stored, said first schedule being recorded in terms of engine torque and line pressure, said second schedule being recorded in terms of throttle valve position and a line pressure correction value;
a control circuit, said control circuit being operatively connected with and responsive to said throttle position sensor, said air flow meter and said engine speed sensor first, second and third sensors, said control circuit being operatively connected with said memory and arranged to produce said control signal, said control circuit comprising circuit means for:
determining the amount of torque being applied to said transmission based on the outputs of said air flow meter and said engine speed sensor;
using the first schedule stored in said memory to determine a line pressure level suited for the amount of torque being applied to the transmission;
comparing the instant throttle opening degree with a predetermined value; and
increasing the level of line pressure in accordance with said second schedule in the event that the instant throttle valve opening degree is greater than said predetermined value.

* * * * *